Nov. 5, 1957 N. T. BALDANZA 2,811,744
APPARATUS AND METHOD FOR INK RECORDATION
ON MOLDING RESINOUS PLASTIC ARTICLES
Filed May 12, 1951 7 Sheets-Sheet 3
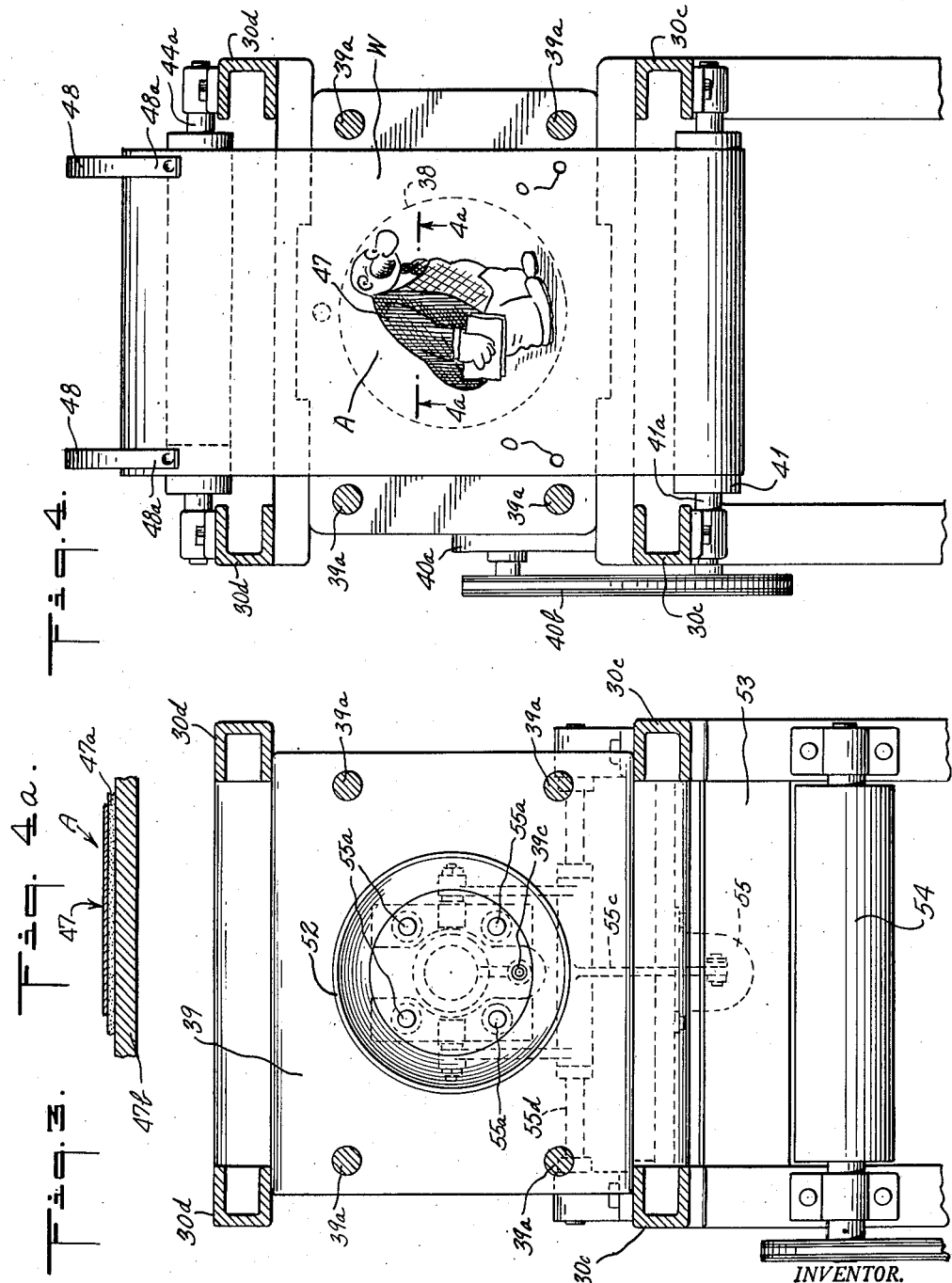
INVENTOR.
NICHOLAS T. BALDANZA
BY
Louis Barnett.
ATTORNEY

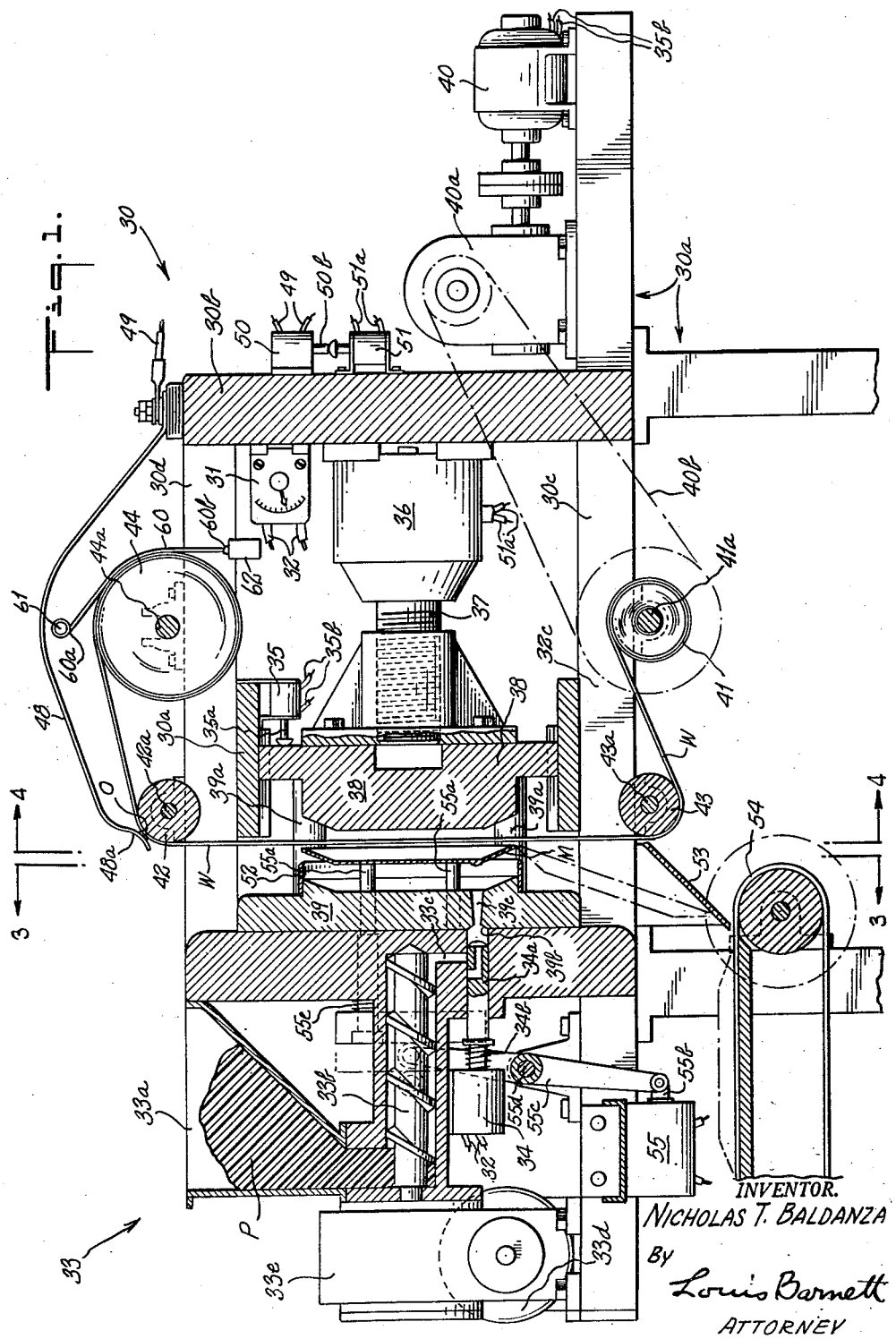

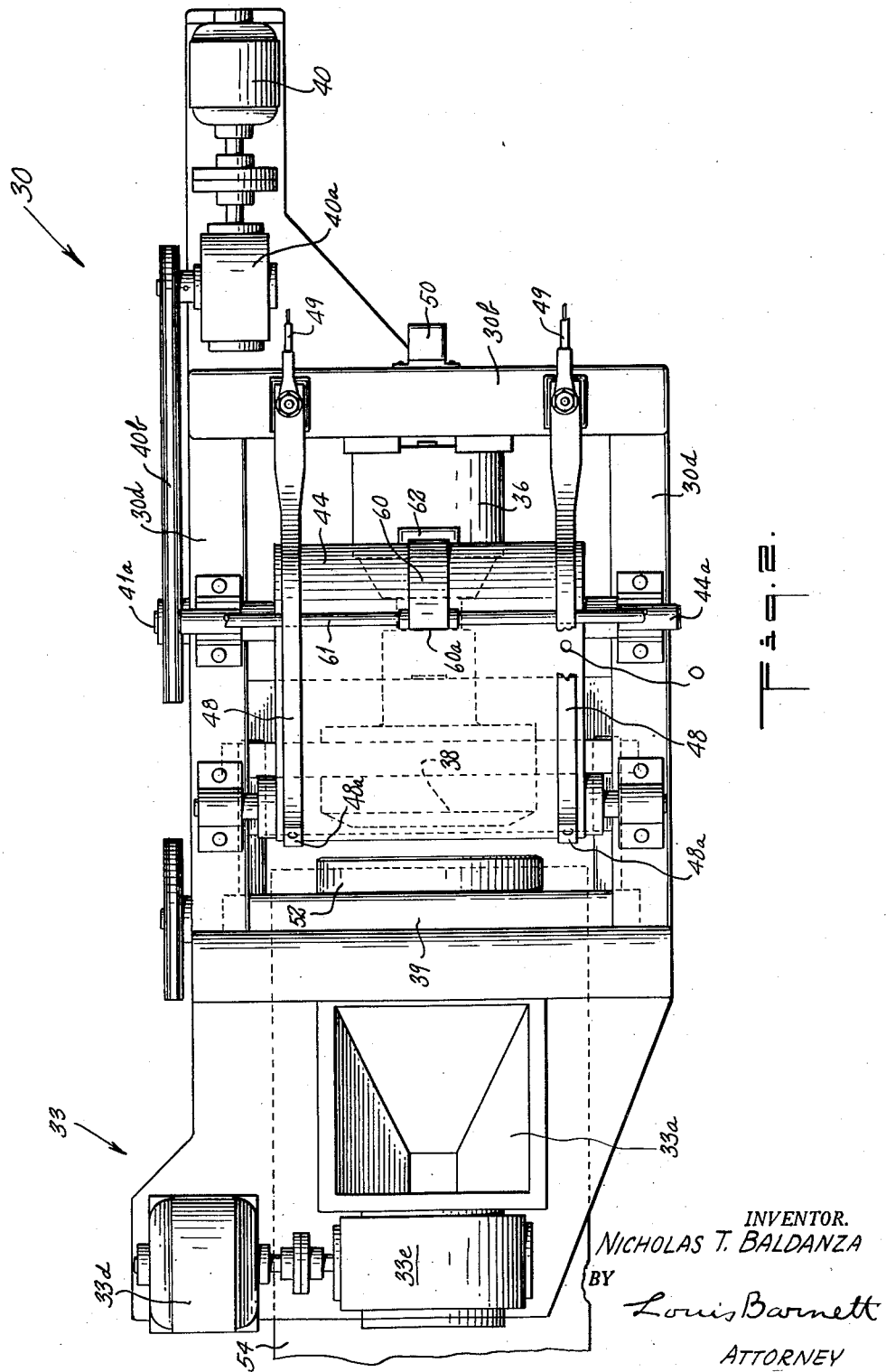

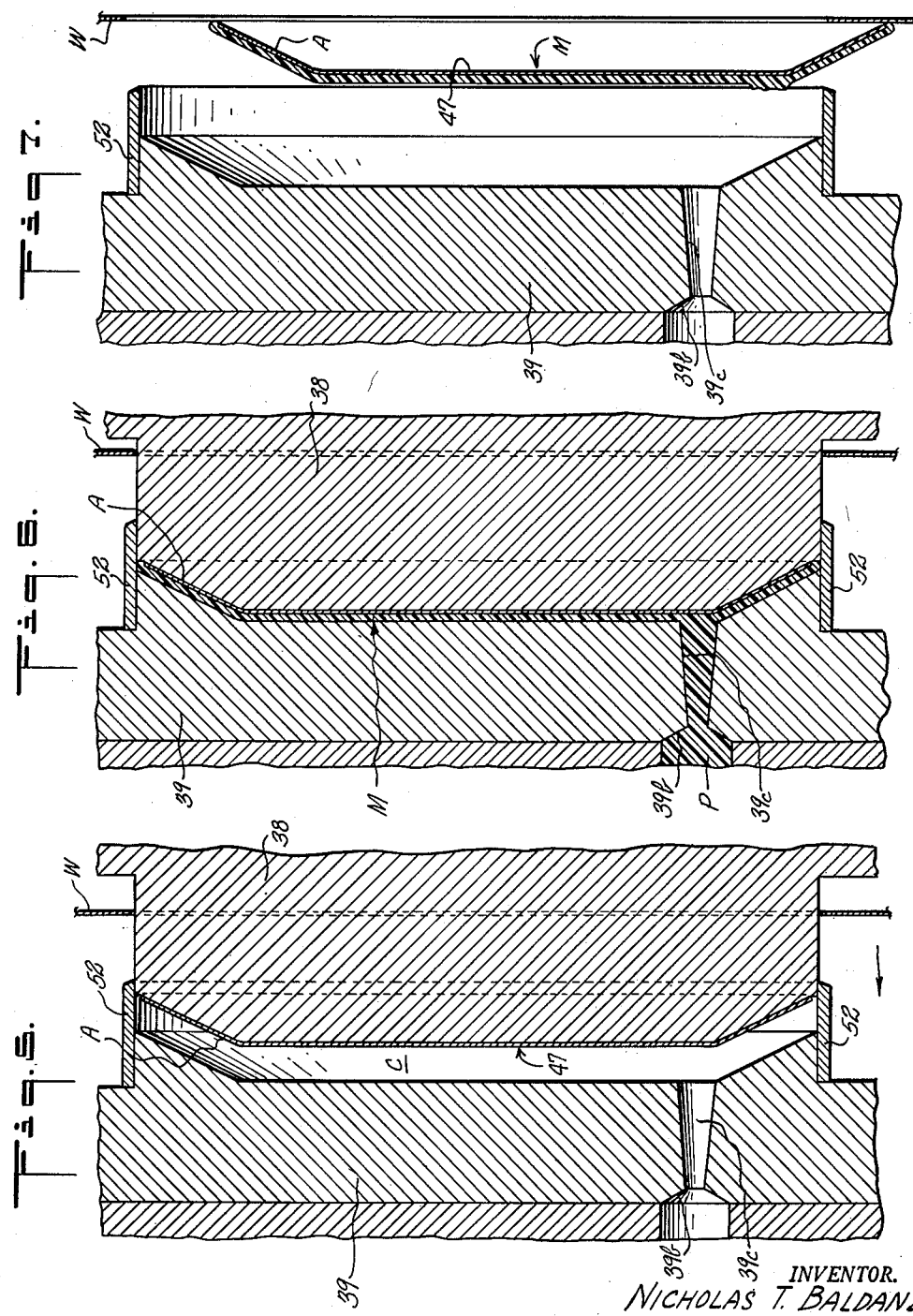

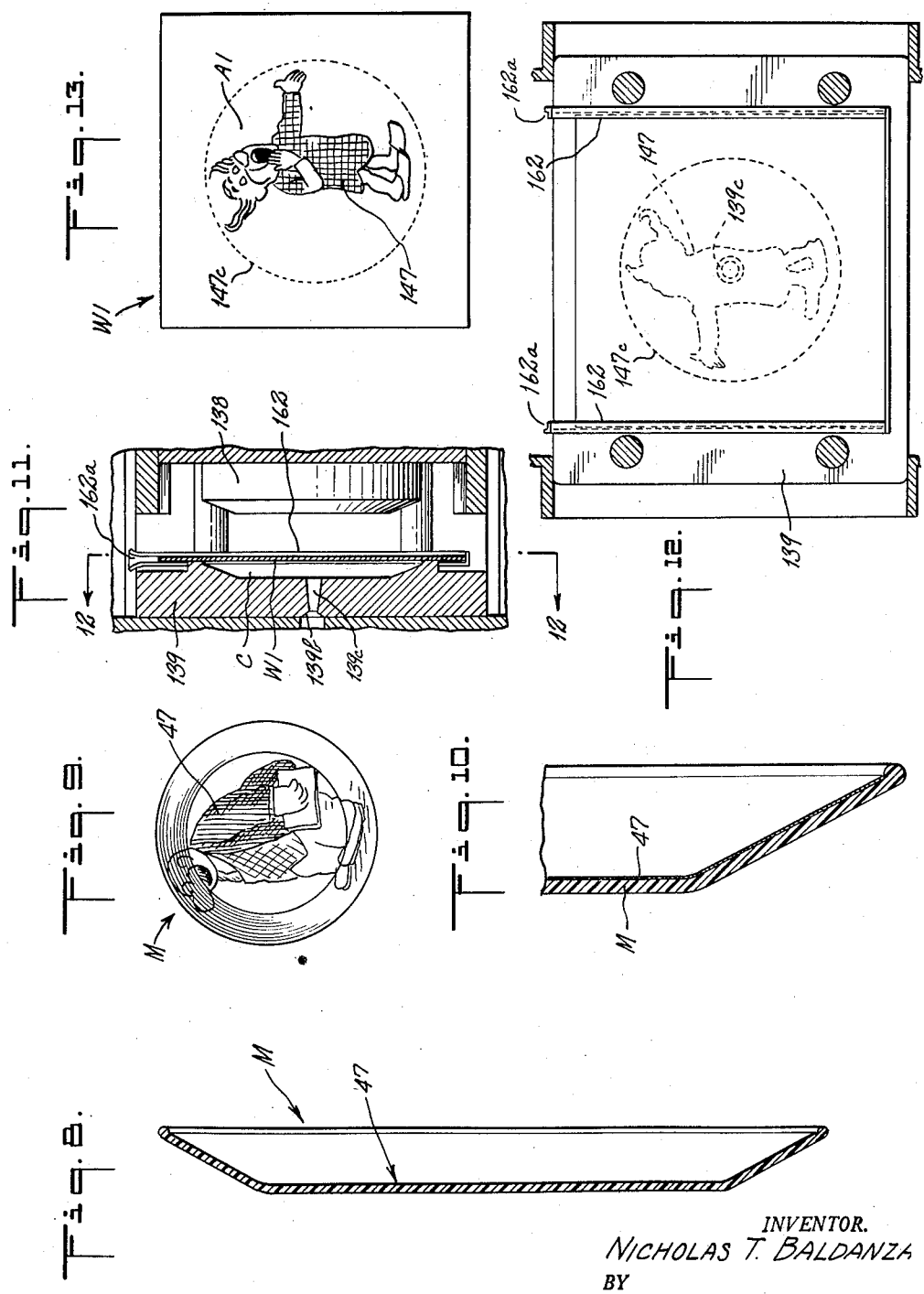

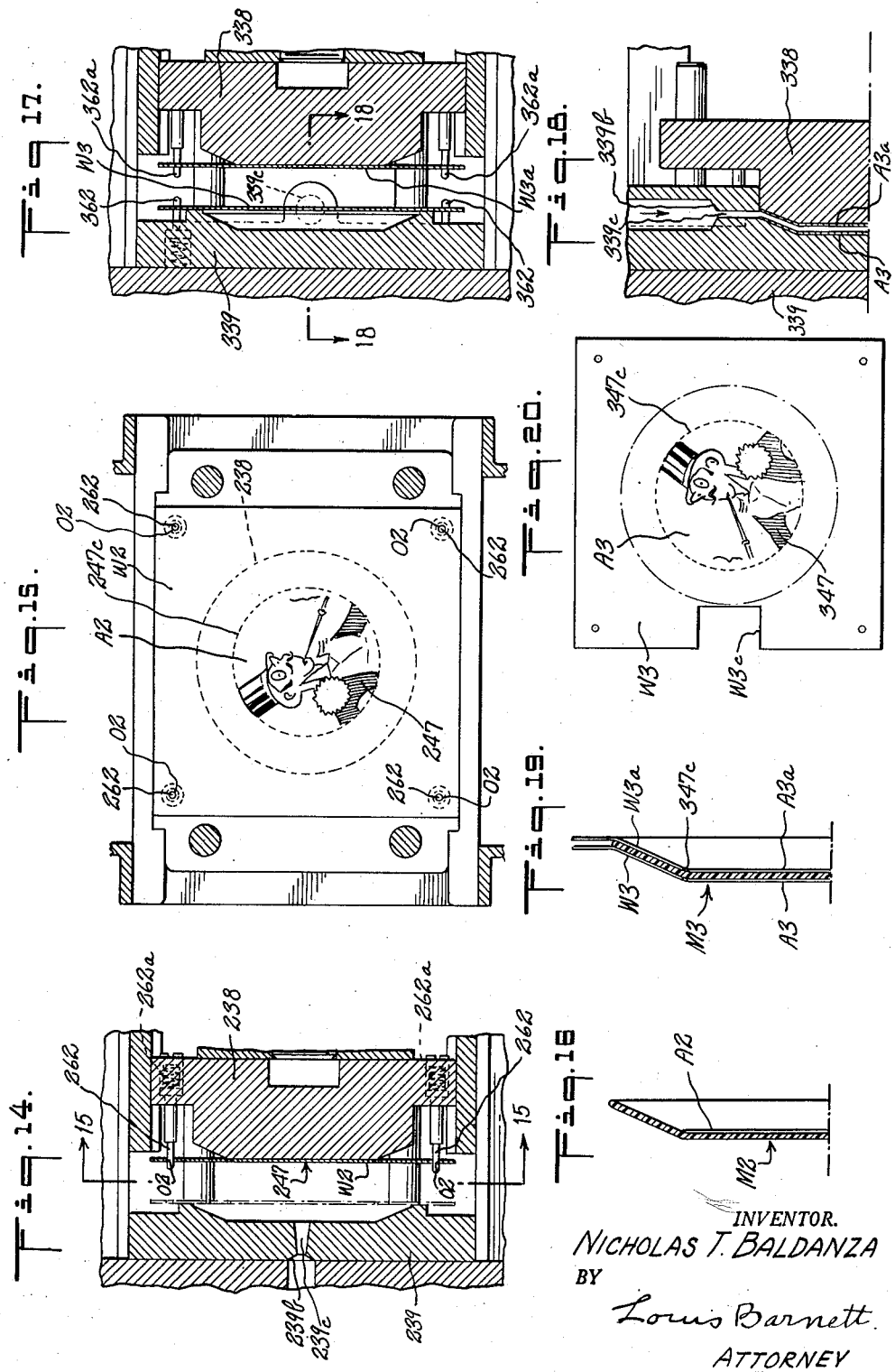

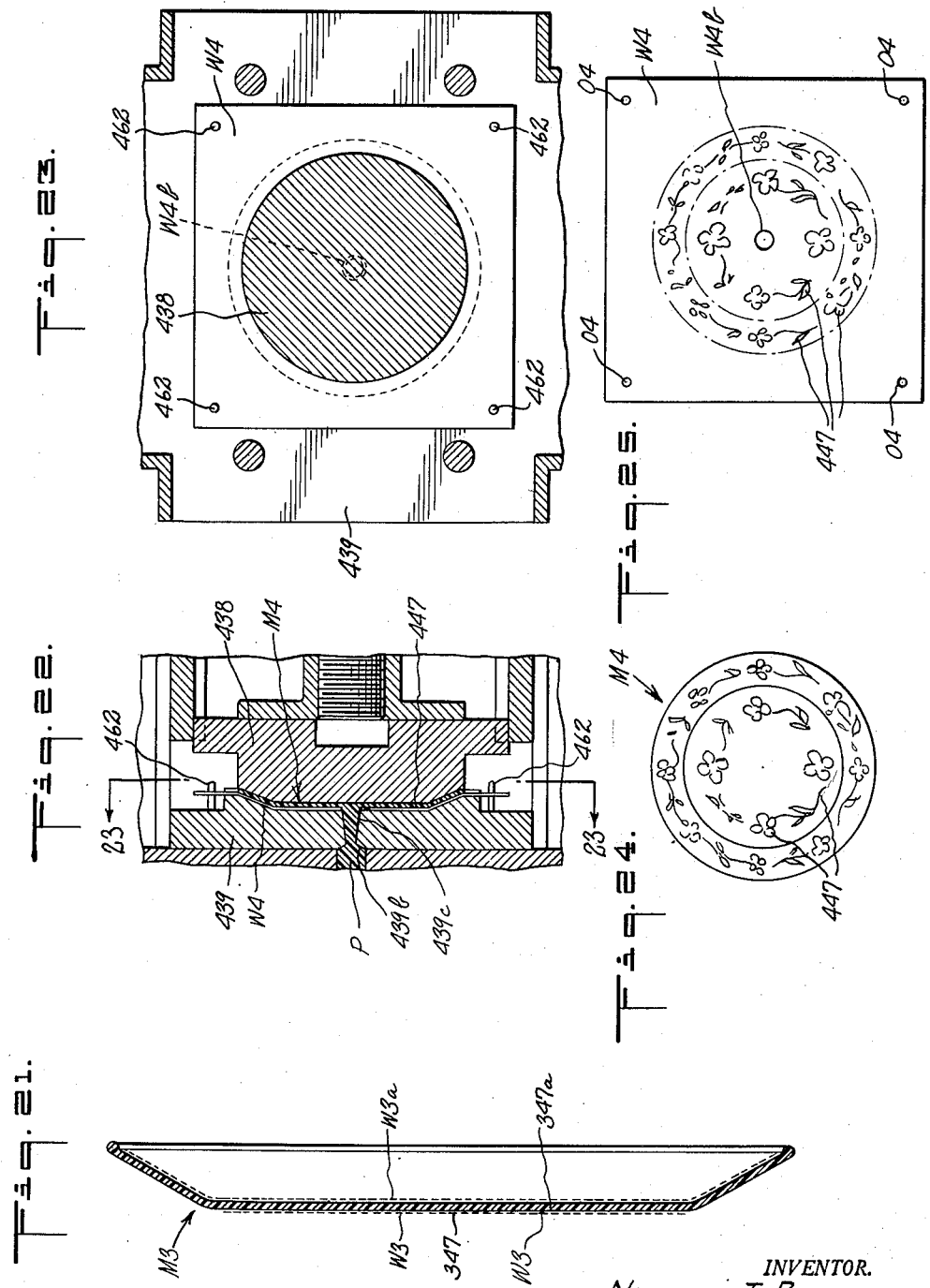

United States Patent Office 2,811,744
Patented Nov. 5, 1957

2,811,744

APPARATUS AND METHOD FOR INK RECORDATION ON MOLDING RESINOUS PLASTIC ARTICLES

Nicholas T. Baldanza, Rutherford, N. J., assignor, by mesne assignments, to Curtiss-Wright Corporation, a corporation of Delaware Application May 12, 1951, Serial No. 225,956

6 Claims. (Cl. 18—5.3)

This invention relates to an apparatus and method for printing or decorating with ink, paint or the like, in desired coloring on resinous plastic molded articles produced during the molding thereof, and more particularly the invention is directed to an improved apparatus and mechanisms thereof assembled for manual or automatic machine operations in applying printed matter or decorations in one or a plurality of desired colors to said plastic molded articles during a period of time that said resinous plastic material forming each article is in a fluid state under pressure until said plastic material solidifies and hardens making the printing or ornamentation an integral part of the molded articles.

The subject matter of this application is a continuation in part of applicant's invention disclosed in Ser. No. 126,218 filed November 8, 1949 and now Patent 2,619,679 granted December 2, 1952.

Among the objects of the invention is to generally improve apparatus of the character described which shall comprise relatively few and simple parts assembled to form a machine and mechanisms thereof capable of operating in a continuous cycle automatically or intermittantly by manual operation, which shall require a minimum of attention, labor and maintenance yet reliably produce printed and ornamental molded articles at a maximum mass volume production rate, which apparatus shall be capable of being constructed of standard commercially obtainable parts and devices, or utilizing existing injection or extruding molding machinery, which improved method shall produce the results desired effectively in a novel manner, and which shall be practical and efficient to a high degree in use.

Other objects of this invention will in part be obvious and in part hereinafter pointed out.

The invention accordingly consists of steps of the method of manufacture and features of construction, combination of elements and arrangement of machine parts which will be exemplified in the method and apparatus hereinafter described and of which the scope of the application will be indicated in the claims following.

In the accompanying drawing in which possible illustrative embodiments of the invention are shown, Fig. 1 is a front elevational view of an improved assembled apparatus for full automatic operation for printing or decorating with ink, paint or the like, in desired coloring on resinous plastic molded articles, constructed to embody the invention, said apparatus being shown partially in section and schematic, a finished molded article being shown positioned just before being discharged from between the open molding dies, and in dot and dash lines successive positions of said article during the discharge movement.

Fig. 2 is a top elevational view corresponding to the improved apparatus shown in Fig. 1 with the resinous plastic supply hopper shown empty.

Figs. 3 and 4 are cross sectional views taken on lines 3—3 and 4—4 in Fig. 1, respectively, the molding dies being in an open position and the web with the ink recordations in an aligning position with respect to said dies.

Fig. 4a is a greatly enlarged diagrammatic sectional view taken on lines 4a—4a in Fig. 4 showing the sheet material structure and ink recordations transferably carried thereon.

Figs. 5, 6 and 7 are fragmentary cross sectional views of the split molding dies in successive operational positions, Fig. 5 showing the dies partially closed after severing the web and ink recordation sheet in an aligned registering position, Fig. 6 showing an ink recordation sheet in position on completion of molding and decorating of the article manufacture embodying the invention, and Fig. 7 showing a successive position of the mold dies with the finished molded plate dropping down during the discharge thereof. For clarity the means for dislodging the molded article free from the stationary die is omitted.

Fig. 8 is an enlarged cross sectional view of the finished article with the ink recordation, said article here being a plate, as molded with apparatus shown in Figs. 1 and 2, and with web paper sheet removed from the ink recordations.

Fig. 9 is a front elevtional view of the plate shown in Fig. 8 in reduced dimension with the ink recordation decorations on the exposed front surface.

Fig. 10 is an enlarged fragmentary cross sectional view showing details of the decorated molded plate construction corresponding to Figs. 8 and 9.

Fig. 11 is a fragmentary cross sectional view showing molded dies and ink recordation sheet portions similar to said portion shown in Figs. 1 and 2 but forming a modification thereof for manual manipulation of the ink recordation sheet instead of providing ink recordations on a traveling web, said ink recordation of the modification being provided on separate insertable sheets supported in alignment against the stationary die.

Fig. 12 is a cross sectional view taken on lines 12—12 in Fig. 11 showing the recordation sheet in the aligned position between the dies.

Fig. 13 is a front elevational view of an ink recordation sheet shown in Figs. 11 and 12 in the form of a fanciful figure as a decorative ink recordation for incorporating in the finished article to be molded by the dies.

Fig. 14 is a fragmentary sectional view similar to Fig. 11 but showing another modification for retaining an ink recordation sheet in alignment between the dies but carried by the movable die.

Fig. 15 is a sectional view taken on line 15—15 in Fig. 14 showing the ink recordation sheet as mounted in place for travel with the movable die.

Fig. 16 is a fragmentary cross sectional view of the molded article forming a plate with the decorative ink recordation sheet as produced by the die construction shown in Figs. 14 and 15.

Fig. 17 is a fragmentary sectional view similar to Fig. 14 of still another modified form of the invention showing the separated dies with ornamental ink recordation sheets mounted for decorating both the front and back of molded article forming a plate.

Fig. 18 is an enlarged fragmentary cross sectional view of the dies shown in Fig. 17 but in a closed position ready to receive the heated resinous plastic material under pressure for forming double faced decorated ink recordations on the molded plate. As is clear from Figs. 17 and 18 injection molding operations may be performed from an edge as distinguished from one flat side of the article being molded shown in Figs. 11 and 14.

Fig. 19 is a fragmentary cross sectional view showing details of the double faced decorative molded article produced by the improved manufacture embodying the invention with dies and ink recordation sheets shown in Fig. 4.

Fig. 20 is one of the sheets with an ink recordation in the form of a fanciful figure removed from between the dies as shown in Figs. 15 and 17.

Fig. 21 is a cross sectional view of a finished molded plate with ink recordation decoration on the front and rear side thereof as formed between the dies shown in Fig. 17, the position of the paper sheet being shown in dash lines.

Fig. 22 is a fragmentary cross sectional view of the molding dies in effective position on a construction similar to Fig. 14 having the sheet with ink recordation ornamentation mounted against the stationary die but provided with a through opening in said sheet to permit the injection from the rear side of the plate and the flow of said material through said opening against the ink recordations.

Fig. 23 is a cross sectional view taken on lines 23—23 of Fig. 22 showing the sheet positioned between the molding dies.

Fig. 24 is a front elevational view of a finished molded plate with ink recordation ornamentation as formed using the dies shown in Figs. 22, and Fig. 25 is a front elevational view of the sheet with the ink recordation ornamentation for use between the dies shown in Fig. 22 to form plate shown in Fig. 24.

Referring in detail to the drawing, 30 denotes an improved apparatus assembly constructed to embody the invention in which Fig. 1 is shown partly broken away to expose details of interior structure of parts of mechanism forming said apparatus 30 as assembled. Some mechanism portions of apparatus 30 are shown schematically only since such are of well understood construction being commercially available and of general type in common use the specific details of which are well known in this and allied arts.

Where said apparatus 30 is to be of an improved type for fully automatic operation, it may include a suitable frame 30a and an electrically operated master control means, such as a circuit switching time-clock 31 of any well known detail construction, or the like, mounted on an upright 30b of frame 30a. Said apparatus 30 may be provided with electric power from an available supply source in the well understood manner with said switching time-clock 31, through wiring 32 connected in circuit with a suitable operating solenoid 34 which when energized slides a valve 34a into a closed position against the action of a compression spring 34b as shown in Fig. 1. Said valve 34a serves to control flowing heated plastic resin passing under perssure through a nozzle seat 39b and sprue passage 39c here shown as extending through a stationary platen die 39. Said plastic resin may be supplied from a suitable injector or extruder of any well known construction denoted generally at 33 as for example, like that shown and described in my application Ser. No. 168,600 filed June 16, 1950.

Said injector or extruder 33 may include a convenient source of supply of a suitable granulated, powdered or liquified molding resinous plastic material, as for example, polystyrene or other suitable plastic material P from a hopper 33a, said plastic material P may pass down to a horizontal disposed feed screw conveyor 33b through valve 34a to sprue passageway 39c communicating with said nozzle seat 39b.

Switching time-clock 31 may be connected in circuit and regulated in a construction and arrangement thereof to energize solenoid 34 for sliding valve 34a into a closed position to cut off the flow of plastic material P at nozzle seat 39b. Concurrently with said movement of valve 34a an electric motor 36 may be started in a direction, which through a suitable travelling transmission interconnecting means, such as a screw jack 37 or other similar devices, to retract a movable mounted platen die 38 from an abutment against stationary mounted platen die 39 in a separating movement until said platen die 38 reaches a predetermined, that is, a limited withdrawn position. The latter is then effective to actuate a contact closing push buton 35a of a switch 35 mounted on frame 30a of apparatus 30 in the path of travel of said platen die 38. Said actuation of push button 35a starts another electric motor 40 connected in circuit with switch 35 through wiring 35b. Motor 36, movable platen die 38, stationary platen die 39, screw jack 37 and motor 40 may be mounted in assembly of apparatus 30 as shown in Figs. 1 and 2, or in any other practical arrangement to conform to requirements of existing installations.

Motor 40 as here shown may be coupled to a speed reduction gearing 40a which through a suitable belt or chain drive 40b slowly turns a shaft 41a with spool or reel 41 for winding thereon an elongated strip or web W. Shaft 41a may be mounted in suitable bearings on lower horizontally extending members 30c of frame 30a as is clear from Figs. 1 and 2.

Winding of said web W on rotation of reel 41 pulls attached sheet material thereof along a path over an electric circuit make and break metallic upper roller 42 and under an idler guiding lower roller 43, the latter being vertically spaced under roller 42. Both roller 42 and 43 may be interposed in spaced relation between reel 41 and a suitable supply source of said sheet material of web W, such as in a roll 44 mounted to turn on a shaft 44a supported by upper horizontally extending members 30d of frame 30a. Suitable braking means to prevent roll 44 from being unwound may be provided, as for example, brake strap 60 anchored on cross bar 61 by an upper end 60a thereof and having a weight 62 terminate a free lower end 60b as shown in Figs. 1 and 2.

Metallic roller 42 which may be horizontally spaced from roll 44, may be supported on a shaft 42a, said roller 42 and roller 43 being positioned to align web W for free passage between movable and stationary dies 38 and 39, respectively, when said movable die 38 is in a retracted position as is clear from Figs. 1 and 2. Guiding roller 43 may be mounted on a shaft 43a supported by lower horizontally extending frame member 30c.

Intermittent interruption of the electric circuit through metallic upper roller 42 may be effected by providing web W with marginal through-openings O which permit ends 48a of spaced apart spring contacts 48 to make electric connection therethrough with metallic roller 42 for closing a circuit with lead wires 49 for energizing a solenoid 50 connected in circuit therewith. A switch 51 actuated by solenoid 50 may be provided to connect in a circuit for controlling motor 36 through wiring 51a, said solenoid 50 having an armature or plunger 50b which when actuated may be utilized to reverse rotation of motor 36 in the well understood manner. Thus as here shown the switch 51 on actuation of the push button 51b thereof by solenoid plunger 50b serves to cause motor 36 to rotate for operating screw jack 37 to advance platen mounted die 38 to its abutment position against stationary mouned die 39 in a complementary relation from its said retracted position established when pressing push button 35a of switch 35 as described above.

Movement of platen mounted die 38 from its full opened position releases limiting switch 35 thereby cutting off the current to electric motor 40 for stopping the winding of the reel 41 and consequently the downwardly advancing movement of the web W. During said closing movement of platen die 38 and stoppage thereof, a cutting knife 52 carried on stationary platen mounted die 39 becomes effective so that a sheet material portion A of the web W is completely severed from a mid section of web W with a transferable ink recordation 47 in proper size and shape to fit against platen mounted die 38 when the two dies 38 and 39 come into abutment, that is, in closed position for forming cavity C therebetween.

Switching time-clock 31 is set and regulated for successive predetermined cycles of operation in any well understood manner, and will then automatically cut off power to stop electric motor 36 and simultaneously energize solenoid 34 for actuating the nozzle valve 34a to an open position for feeding the flow of plastic resin P therethrough to seat 39b and sprue passage 39c from the injector or extruder 33 hence into mold cavity C formed by closed dies 38 and 39 in a fluid heated state under pressure against ink recordation 47 carried by said enclosed sheet material web portion A until the entire cavity or chamber C between said dies 38 and 39 is filled. Slide valve 34a is held in open or communicating position with said chamber C for an interval or period of time sufficient to fill said chamber C after which solenoid 34 is again deenergized to permit slide valve 34a to cut off said flowing plastic resin P thereat from the supply by injector or extruder 33 to said mold cavity C as heretofore described. One cycle of automatic operation of apparatus 30 is thus completed by switching time-clock 31 when motor 36 is energized for reversing the directional movement of screw jack 37 to separate movable platen die 38 from its closed position against stationary die 39.

When movable platen die 38 has reached its full open position as above described, article M in chamber C molded to a desired configuration, here shown as a conventionally shaped dinner plate with ink recordations 47 transferred thereto intact from sheet material portion A fused in and baked, as for example, as shown in Fig. 4 said ink recordation 47 may be in form of a fanciful figure. Said molded plate M after having time to cool and solidify is then caused to drop down, through a passageway provided by the separation between said dies 38 and 39 onto a suitable discharge means of any well known construction such as a deflecting ramp 53 for loading on carrier belt conveyor 54 as indicated by the dot and dash positions of said article M in Fig. 1. With apparatus 30 constructed as described above cycles of automatic operation may successively be repeated through control provided by switching time-clock 31 in the practising of the invention.

The strip of sheet material forming web W may be of a suitable coated paper stock provided with transferable desired ink recordations 47 carried on a side thereof and when positioned to face stationary platen die 39 will be fused by pressure baking to the molding article M in cavity or chamber C on the side of said article M facing the movable platen die 38 against which cut web portion A is pressed.

As is fully described in said copending application Ser. No. 126,218, the web W may be made of a paper sheet strip employing both various single color or multi-color printing as the transferable ink recordations 47. As diagrammatically shown in Fig. 4a surface coating 47a of said web W may, as for example, be of the "machine coated surface" type having a principal clay or starch base or other sizing material provided thereon in a well understood manner on which color inks forming ink recordation 47 are carried in satisfactory "typography." The term "typography" is herein used to denote ink or other pigment recordations made by any one of the well known letterpress, lithographic or gravure printing processes.

When web W is made of paper 47b, it preferably may be of a character that absorbs water when immersed therein or applied thereto and the ink recordations 47 may be substantially of waterproof composition.

On positioning and retaining ink recordations 47 in a desired registered alignment with respect to the surface of the article M being molded, the plastic resin, as for example, polystyrene, nylon, or other like material when injected against the ink recordation 47 uniformly spreads under pressure forcing the transfer of the ink recordation 47 unmodified to any perceptible degree onto the surface of the molded article M and is brought into a baked or fused adhesion thereagainst intact in situs simultaneously with the molding solidification of the article M without bleeding or distortion of the composition of the ink recordation 47 thereby providing a surface of printing or recordation in one or a plurality of colors as desired.

Where polystyrene is used with an injector 33 it has been found that the temperature of the resinous plastic P may range from about 325° to 375° F., under pressures of approximately 10,000 lbs. per sq. inch to give satisfactory results in carrying out the above described manufacturing operations with ink recordations 47 made with any well known resin base ink having thermoplastic properties of limited compatibility with said plastic material P, that is, such that will fuse with resinous plastic material P but will be free from bleeding or distortion to any visible degree. Other available printer's ink which has similar or equivalent inherent characteristics like that herein specifically described, however, may also be used to provide said ink recordations 47.

Ink recordations 47, by the so-called "letter press printing method" may be utilized in practising this invention, and may comprise colored inks such as yellow, magenta and blue green, and if desired also black. These various colored inks may be imposed in films or layers of about .00025 of an inch in thickness from which a wide range of color effects may be produced as is well understood in the printing art.

After the resinous plastic material P in cavity or chamber C solidifies to form molded article M with said ink recordation 47 transferred in fused and baked in unmodified condition thereon, dies 38 and 39 on being separated as described above may not release said finished article M to be free therefrom, and may often be found to stick and fail to drop down therebetween. To make dislodgement of the finished molded article M from between dies 38 and 39 positive, switching time-clock 31 may have connected in operative circuit therewith a solenoid 55 which actuates suitable means such as spaced apart dislodging pushers 55a. The latter may extend through platen die 39 for pressing the finished solid molded article M free from the latter. Said pushers 55a may be mounted for sliding movement actuated by plunger 55b of solenoid 55 through a suitable bell crank 55c, pivotally supported on frame member 30c as at 55d, against the action of coil compression springs 55e as is clear from Fig. 1.

Each of said molded articles M on dropping down between said separated dies 38 and 39 and diverted by deflecting ramp 53, is carried on belt conveyor 54 to a finishing station where the adhering paper sheet 47b of web portion A covering the fused on ink recordation 47 is removed, as for example, by soaking in water in the manner similar to that more fully described in my aforesaid copending application Serial No. 126,218.

As seen from Figs. 1 and 2, a suitable power means such as motor 33d with a speed reduction gearing 33e, when required, may be provided for driving screw conveyor 33b and spaced apart parallelly aligned guide rods 39a may be provided to horizontally extend from stationary die 39 to serve as a trackway for movable die 38 to ride on to assure positioning said dies 38 and 39 in proper closed molding alignment as is clear from Figs. 2, 3, and 4.

It has been found that in practicing the improved manufacture embodying the invention that paper sheet stock material 47b forming web W may, for example, be prepared from about 33⅓% ground wood pulp with about 66⅔% chemically prepared wood pulp, said paper stock 47b having a coating 47a formed thereon of about 62% mineral composition and about 38% organic composition. Said mineral composition may comprise titanium dioxide, calcium carbonate, "satin white," the latter being composed of calcium sulfate, calcium oxide and aluminum hydroxide. Said organic coating composition may comprise about 20% gelatin (resin) and about 18% starch.

An ink composition found to give satisfactory results to serve for recordation 47 may be of the following composition: about 65% plastic ink vehicle, 30% pigment tone (color as desired) and 5% dibutyl phthalate, totaling 100%. The plastic ink vehicle may be formed of solid phenol fumaric resin of about 60%, fractional mineral oil (boiling range 500° to 550°) 32% and plasticizer such as dioctyl phthalate 8%, totaling 100%.

In Figs. 5, 6 and 7 there is shown fragmentary cross-sectional views of the split molding dies 38 and 39 in various positions of the latter during each cycle of the improved operation of apparatus 30 above described. In Fig. 5 said dies 38 and 39 are shown during the closing movement thereof and in position shortly after sheet material portion A has been severed from a mid section of the web W by cutting knife 52. In Fig. 6 said dies 38 and 39 are shown in fully closed position with completely molded article M including ink recordation 47 carried by said sheet material portion A in cavity C. In Fig. 7 which corresponds to portion of Fig. 1 said dies 38 and 39 are shown separated in full open position but with the finishing molded plate M dropped down a short distance during the discharge thereof. For clarity the dislodging pushers 55a have been omitted for Figs. 5, 6 and 7.

In Figs. 8, 9 and 10 details of the structure of the completely finished molded plate M with ink recordation 47 is shown after the sheet material portion A has been removed. Fig. 8 shows an enlarged cross sectional view of said molded plate M; Fig. 9 a front elevational view of said plate M in reduced dimensions with ink recordation 47 forming a front decoration thereof; and Fig. 10 is a greatly enlarged fragmentary cross sectional view showing the details of the structure of said plate M with ink recordation 47 corresponding to Figs. 8 and 9.

Thus it is seen that apparatus 30 provides a novel and improved manufacture through the automatic control provided by switching time-clock 31. Starting with split dies 38 and 39 fully open in which position die 38 actuates push button 35a of switch 35 to start motor 36 for operating screw jack 37 whereby die 38 is moved to closing position after the molding and discharging of each article M from cavity C. Since web W has previously been drawn down to pass between split dies 38 and 39 while the latter are still open, closing movement of die 38 toward die 39 is effective to cut sheet material portion A from a mid section of web W by knife 52 as described above and shown in Figs. 1 and 5. Web W then is in an aligned operative position so that the ink recordation 47 on said sheet material portion A will come into a predetermined desired location and position on the molded article or plate M. During the above described die closing movement and sheet material portion A cutting operation, motor 40 remains disconnected from electric power by switching time-clock 31, and winding reel 41 is at rest for retaining the web W taut as assisted by the frictional drag action of brake strap 60 with ink recordation 47 in proper relation position for assuring said predetermined location and position since after sheet material portion A has been cut the latter stays positively retained between said dies 38 and 39 in cavity C as is clear from Figs. 5 and 6.

During said die closing movement, switching time-clock 31 also cuts off the power to solenoids 34 and 55 so that slide valve 34a remains in a closed position and pushers 55a are fully retracted.

When dies 38 and 39 are fully closed, solenoid 34 is energized whereby slide valve 34a is projected into nozzle seat 39b permitting heated flowing resinous plastic P under pressure to pass from injector 33 through sprue passage 39c into mold cavity C. After the latter is filled, resinous plastic P is permitted to cool for a short interval of time and solidifies to form molded article M with the transferred ink recordation 47, during which time the latter is fused and baked in the predetermined position.

Thus briefly stated the steps and events embodying each cycle of the improved method of automatic manufacture starting with the platen dies 38 and 39 closed having cavity C formed therebetween filled with a molded article M by the prior cycle of operation switching time-clock 31 is effective to energize solenoid 34 for pulling back, that is, retracting slide valve 34a to a closed position thereby cutting off the flow of resinous plastic P. Also motor 36 is started to turn screw jack 37 for opening cavity C by withdrawing platen die 38 from die 39 which at the end of the withdrawal stroke presses push button 35a of switch 35 in the manner described above. The latter being connected in circuit to start motor 40, winds web W on reel 41 when said dies 38 and 39 are seperated a distance to permit the free passage of the web W therebetween.

In discharging the molded article M from between the mold dies 38 and 39 and just prior to the fully retracted opening movement of platen die 38, solenoid 55 may be momentarily energized by switching time-clock 31 to actuate sliding pushers 55 through plunger 55b and bell crank 55c against the action of compression spring 55e. This operation pushes the molded article M free of die 39 to permit said article M to drop down onto deflecting ramp 53 and then loaded on belt conveyor 54.

When web W has advanced down between said dies 38 and 39 at least a length of portion A for aligning the next ink recordation 47 thereon to a desired position and location for the article M to be subsequently molded, motor 40 is disconnected from the power supply, said portion A being determined by the spacing of said web marginal through-openings 0. When opening 0 of the length portion A on unwinding of supply roll 44 passes under spring contact ends 48a the circuit through metallic roller 42 is completed and solenoid 50 is energized to push switch 51 for reverse turning motor 36 to operate screw jack 37 in a direction to close dies 38 and 39. This latter movement as described above releases push button 35a to stop motor 40 and the winding of web W on reel 41 with the length of web portion A aligned in predetermined position and location ready to be severed by knife 52, the latter during the closing of dies 38 and 39 cutting a mid-section of web W forming said portion A and fitting the same in said mold cavity C.

When dies 38 and 39 are in tightly closed position, switching time-clock 31 cuts off the power to motor 36 and to solenoid 34, permitting compression spring 34b to be effective to actuate slide valve 34a to open position communicates the flow of the heated resinous plastic P under pressure from the injector 33 to cavity C. During filling of the latter, the heated resinous plastic P under pressure fuses the ink recordation 47 thereto in an intact transferred baked condition, and is allowed to cool after the filling has been completed to solidification. Thus ends the cycle which may be successively repeated by continuing the operation through switching time-clock 31.

It is contemplated to practise the improved method embodying the invention in simplified forms with manual operations replacing some of the automatic steps provided by switching time-clock 31, as for example as shown in Figs. 11 to 13, so that with such simplification standard molding equipment may be altered at a minimum expense to produce the improved results.

To that end as here shown stationary mold die 139 instead of said mold die 39 may be provided to manufacture resinous plastic article in the form of a dished plate similar to molded article M produced by molding dies 38 and 39 shown in Figs. 8 to 10 and as above described. However, the nozzle seat 139b and sprue passage 139c of die 139 is shown located centrally with respect to cavity C as an alternative position for the seat 39b and sprue passage 39c shown in off-center relation in Figs. 6 and 7.

The aforedescribed wound web W may be replaced by individual sheets W1, such for example as shown in Fig. 13, perforated along line 147c encircling mid-portion A1 carrying ink recordation 147 of said sheet W1, the latter being similar to sheet portion 47 above described.

To provide for aligning and positioning ink recordation 147 to a predetermined fused in and baked position on the plate to be molded, a suitable open holder 162 for sheet W1 positioned beyond the path of travel of movable mold die 138 may be carried by mold die 139 to surround the cavity C formed with die 138, as is clearly shown in Figs. 11 and 12. Said holder 162 may have a side inlet 162a into which a sheet W1 may be manually inserted in place and retained as seen from Figs. 11 and 12 for interposing between mold dies 138 and 139, so that when mold die 138 is moved into closed position said mid-portion A1 is detached from sheet W1 along perforated line 147c and secured between the mold dies 138 and 139 with the ink recordation 147 in the desired alignment like sheet portion A on closure of mold dies 38 and 39 described above. Thus a simple manual operation of inserting sheet W1 in holder 162 is provided in place of the automatic movement of the web W by switching time-clock 31.

Instead of providing aligning and positioning of ink recordation 147 by means such as holder 162 carried by mold die 139 as described above for sheet W1, there may be provided as shown in Figs. 14 and 15 a similar sheet W2 having a mid-portion A2 detachable therefrom along perforated line 247c sheet W2 being secured to move with mold die 238 with the ink recordation 247 in the desired alignment, like sheet portion A or A1 described above, on closure of movable die 238 against stationary die 239. Such operation may be accomplished by providing spaced apart fastener pins 262 projecting from movable die 238 and located to extend beyond the plane of the face thereof, each pin 262 being resiliently mounted on spring anchorage 262a.

Thus sheet W2 may be secured in aligning mounted position by inserting the free ends of said pins 262 into complementary fastener corner spaced apart opening O2 provided in sheet W2 when said dies 238 and 239 are in full open position, and said mid-portion A2 will be detached along perforated line 247a with the ink recordation 247 in desired alignment on moving said die 238 to its closed position as described above for sheet portion A or A1 on closure of dies 38 and 39 or 138 and 139, respectively, and as is clear from Figs. 14 and 15 in which said sheet W2 is indicated in dot and dash lines when said dies 238 and 239 are in a partially closed position. In this modified form of the invention another simple manual operation of inserting sheet W2 on said pins 262 may be used in place of said automatic timed winding operation for web W. Said mold die 239 may be provided with a centralized sprue passage 239c and nozzle seat 239b similar to those described above for mold die 139.

It is often desirable to provide ink recordations on the rear side of molded articles instead of or in addition to providing same on the front side as shown in Figs. 8, 9, 10 and 16 by the operation with said molding dies 38 and 39, 138 and 139, or 238 and 239 as described above. Such results embodying the invention may be accomplished by providing a construction and operations with separable dies 338 and 339 as shown in Figs. 17 and 18 with manual insertion of sheets W3 and W3a on fastener pins 362 and 362a, respectively, each like that described above for mounting sheet W2 in alignment as shown in Figs. 14 and 15, but in which arrangement sprue passage 339c and nozzle seat 339b may be located to direct the flow into the mold cavity from a perimeter edge as is clear from Fig. 18. Web sheets W3 and W3a may be cut away at W3c beyond perforations 347c encircling detachable mid-portions A3 and A3a with ink recordations 347 as is clear from Figs. 18 and 20 to accommodate the above described arrangement. In such production, the resinous plastic P flows in between said detached portions A3 and A3a and forms molded article M3 shown in Fig. 19.

If desired only one side of molded article M3 may be fused with ink recordation 347, the side so selected alone being provided with either sheet W3 or W3a.

Since the molding equipment available may not be of a type for readily permitting perimeter edge filling as described above and shown in Figs. 17 and 18, an improved manufacture of providing ink recordation 447 on a side of molded article M4 adjacent sprue passage 439c and nozzle seat 493b as shown in Fig. 22, where only mold dies like 138 and 139, or 238 and 239 are used. The resinous plastic material P is then introduced from the cavity side forming the rear of said article M4. Sheet W4 may be formed with corner spaced apart openings O4 wherethrough alignment fastener pins 462 carried by die 439 are fitted, there being also provided a central through-opening W4b sized and shaped to conform and register with the leading end of sprue passageway 439c as shown in Fig. 22.

With this arrangement the production of molded article M4 requires the resinous plastic P to flow through said opening W4b to fill the cavity formed by dies 438 and 439 against ink recordations 447 which is fused in and baked on the exterior side of molded article M4 as is clear from Figs. 22 and 24.

If desired a sheet W2 and pins O2 may also be used in conjunction with sheet W4 so as to provide ink recordations on both sides of the article as in article M3 but utilizing the type of molding equipment shown as dies 238—239, and 438—439, having the sprue passage located for central filling.

After articles M, M2, M3 or M4 are molded with their respective ink recordations and discharged, the adhering web portions may be water soaked and removed as has been hereinbefore described. To preserve the exposed fused ink recordations against abrasion or accidental damage, a clear lacquer or plastic coating may be applied by spray or brush in the well understood manner.

It will thus be seen that there is provided an apparatus and method for ink recordation on molding resinous plastic articles of the character described whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention I claim as new and desire to secure by Letters Patent:

1. In the manufacture of resinous plastic molded articles, the steps of inserting sheet material carrying transferable ink recordations thereon as successive portions of a continuous web between split dies which form when closed a cavity with said ink recordations spread out in a predetermined alignment with respect to a wall of said cavity, forcing under pressure flowing resinous plastic material in a heated state into the cavity and against said ink recordations for fusing and baking the latter in an unmodified configuration to said resinous plastic molded article prior to and during solidification thereof, continuing said steps in successive cycles of operation, and detaching each of said molded articles with a portion of the sheet material adhering thereto from the web during each operating cycle.

2. In the manufacture of resinous plastic molded articles with ink recordations on opposite facing sides thereof, the steps of inserting a plurality of sheets carrying transferable ink recordations thereon between open split dies forming when closed a cavity for molding said article to a desired configuration, aligning each of said inserted sheets with its ink recordation in a predetermined position with respect to a wall of said cavity for locating said ink recordations to correspond to a desired site on opposite sides of the finished molded article, closing said dies with the sheets retained in such alignment, injecting resinous plastic in heated flowing state between said sheets while in a spaced apart relation and in direct contact with each of said ink recordations to fuse and bake said ink recordations intact on opposite sides of the molding resinous plastic article during said injecting and solidification thereof.

3. In an apparatus of the character described, split dies forming when closed a cavity for molding articles to a desired configuration, means for moving said dies to and away from each other into open and closed positions respectively, sheet material carrying transferable ink recordations thereon supported between said dies, and means projecting from at least one of said dies for aligning the ink recordations with respect to a predetermined position to one wall of said cavity corresponding to region of a surface of the article to be molded onto which said ink recordation is to be transferred, said split dies being of multi-part construction including a relatively stationary part and a movable part, said stationary part supporting said projecting ink recordation aligning means, said split dies having a passageway formed therebetween for communicating with said cavity wherethrough flowing heated resinous plastic under pressure is forced against said ink recordations and a wall of said cavity, said sheet material having an opening registering with an end of said passageway in the cavity, and another means projecting from said movable die part supporting an additional sheet material carrying transferable ink recordations thereon supported between said die parts in spaced relation to the first mentioned sheet material for aligning the last mentioned ink recordation with respect to a predetermined position to another wall of said cavity.

4. In an apparatus of the character described, split dies forming when closed a cavity for molding articles to a desired configuration, means for moving said dies to and away from each other into open and closed positions respectively, sheet material carrying transferable ink recordations thereon supported between said dies, and means projecting from at least one of said dies for aligning the ink recordations with respect to a predetermined position to one wall of said cavity corresponding to region of a surface of the article to be molded onto which said ink recordation is to be transferred, said sheet material being formed, with a weakened mid-portion bearing the entire ink recordations so constructed and arranged that the said mid-portion is completely detached from the sheet material on closing of said dies in forming the cavity.

5. In the manufacture of resinous plastic molded articles with ink recordations, the steps of supplying successive portions of a continuous web of sheet material between open split dies forming when closed a cavity for molding said article to a desired configuration, each of said portions carrying a transferable ink recordation thereon, aligning each of the said portions of the sheet material between the dies with the recordation thereon in a predetermined position with respect to a wall of said cavity for locating the ink recordation to correspond to a desired site on the finished molded article, successively closing said dies on a sheet material portion retained in alignment therebetween thereby severing the sheet material portion from the web and injecting resinous plastic under pressure in heated flowing state between the sheet material portion and one of said dies in direct contact with said ink recordation to fuse and bake the latter intact to the molding resinous plastic article prior to and during solidification of said article being molded.

6. In the manufacture of resinous plastic molded articles, the steps of inserting sheet material carrying transferable ink recordations thereon as successive portions of a continuous web between split dies which form, when closed, a cavity with said ink recordation spread out in a predetermined alignment with respect to a wall in said cavity, forcing under pressure flowing resinous plastic material in a heated state into the cavity and against said ink recordations for fusing and baking the latter in an unmodified configuration to said resinous plastic molded article prior to and during solidification thereof, continuing said steps in successive cycles of operation, detaching each of said molded articles with a portion of the sheet material adhering thereto from the web during each operating cycle, and removing from each of said detached molded articles the adhering sheet material separated from the fused ink recordations left intact on the molded articles.

References Cited in the file of this patent
UNITED STATES PATENTS

| | | |
|---|---|---|
| 239,792 | Hyatt | Apr. 5, 1881 |
| 273,527 | Herbert | Mar. 6, 1883 |
| 1,496,753 | Burkley | June 3, 1924 |
| 1,650,666 | Toepfert | Nov. 29, 1927 |
| 2,035,801 | Gastrow | Mar. 31, 1936 |
| 2,193,935 | Mulcahy | Mar. 19, 1940 |
| 2,200,633 | Morin et al. | May 14, 1940 |
| 2,207,600 | Seaver | July 9, 1940 |
| 2,274,279 | Shaw | Feb. 24, 1942 |
| 2,357,950 | Goessling | Sept. 12, 1944 |
| 2,415,961 | Nast | Feb. 18, 1947 |
| 2,465,656 | Morin | Mar. 29, 1949 |
| 2,500,598 | Axelrod | Mar. 14, 1950 |
| 2,523,234 | Rado | Sept. 19, 1950 |